US006374601B1

(12) United States Patent
Sudau

(10) Patent No.: US 6,374,601 B1
(45) Date of Patent: Apr. 23, 2002

(54) HYDRODYNAMIC DEVICE

(75) Inventor: Jörg Sudau, Niederwern (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/658,848

(22) Filed: Sep. 11, 2000

(30) Foreign Application Priority Data

Sep. 9, 1999 (DE) .......................... 199 43 019

(51) Int. Cl.[7] .............................................. F16D 33/02
(52) U.S. Cl. ...................................................... 60/326
(58) Field of Search ........................... 60/326, 352, 347

(56) References Cited

U.S. PATENT DOCUMENTS 2,838,912 A * 6/1958 Grebe ......................... 60/326

FOREIGN PATENT DOCUMENTS

DE  197 36 297 A1  3/1999 ........... F16H/61/54

* cited by examiner

Primary Examiner—F. Daniel Lopez
Assistant Examiner—Thomas E. Lazo
(74) Attorney, Agent, or Firm—Cohen, Pontani, Lieberman & Pavane

(57) ABSTRACT

A hydrodynamic device comprises at least one and preferably two vane wheels in a housing cover which are rotatable with respect to one another about an axis of rotation (A) and a work fluid arranged in the housing cover which can be driven to movement by the at least one vane wheel. The work fluid is electrically conductive and a magnetic device is provided for generating a magnetic field in the area of the work fluid circulation. Further, a electric device is provided for generating an electric current flow through the work fluid.

28 Claims, 3 Drawing Sheets

HYDRODYNAMIC DEVICE

BACKGROUND OF THE INVENTION

1. Field of the Invention

The present invention is directed to a hydrodynamic device comprising at least one vane wheel arranged in a housing cover and rotatable about an axis of rotation and a work fluid in the housing cover which can be driven to movement by the at least one vane wheel.

2. Description of the Related Art

A hydrodynamic device in the form of a hydrodynamic torque converter provided with a throttle element which is displaceable by the application of pressure for changing the converter characteristic is known from German reference DE 197 36 297 A1. The throttle element is selectively displaceable between an advanced position in which a throttle projection of the throttle element is engaged in the fluid circulation in the region of the impeller wheel and a retracted position in which there is essentially no such engagement. When the throttle projection is advanced into the fluid circulation, the fluid circulation is impeded so that the fluid-dynamic coupling between the impeller wheel and the turbine wheel is at least reduced. This state is occupied particularly when the driving unit is started, so that the energy required for starting the driving unit is reduced by the at least partly decreased or absent output transmission capacity of the torque converter. In normal converter operation, the throttle element is retracted to unblock the fluid circulation so that the converter accordingly realizes its function for transmitting and converting the torque introduced from the driving unit.

The construction of this known hydrodynamic torque converter is relatively complicated because it requires a throttle element that is displaceable even when the fluid pressure in the interior of the converter is relatively high and it requires control lines for the throttle element. Further, since this known device requires an additional component which is mechanically displaceable during operation must be provided, i.e., the throttle element, the risk of malfunction, for example, when the throttle element jams as a result of vibrations, is increased over a torque converter without the throttle element.

SUMMARY OF THE INVENTION

It is the object of the present invention to provide a hydrodynamic device by which the flow behavior of a work fluid contributing to the transmission of torque can be influenced in a reliable manner.

According to the present invention, the object is met by a hydrodynamic device comprising at least one vane wheel arranged in a housing cover and rotatable about an axis of rotation and a work fluid in the housing cover that can be driven to circulation by the at least one vane wheel within the housing cover. The hydrodynamic device preferably comprises at least two vane wheels.

The work fluid is electrically conductive. The hydrodynamic device further comprises a magnetic device for generating a magnetic field in the area of the work fluid circulation within the housing cover and an electric device for generating an electric current flow through the work fluid.

In such an arrangement of a hydrodynamic device according to the present invention, a Lorentz force is generated by the interaction of the magnetic field and the electric current flowing through the magnetic field. Since the electric current flow is through the work fluid, the Lorentz force also acts on the work fluid. Accordingly a force may be generated with respect to the existing or planned flow direction of the work fluid circulation for accelerating or retarding the work fluid circulation depending on the direction of the magnetic field and on the direction of the electric current flow. When the hydrodynamic device comprises a plurality of vane wheels such as, for example, in a hydrodynamic torque converter, the acceleration or retardation of the work fluid circulation ultimately changes the characteristics of the hydrodynamic device.

The direction of the magnetic field and electric current flow may be suitably selected to act on the work fluid in a deliberate manner to reduce the fluid-dynamic coupling between two vane wheels, for example, in a hydrodynamic coupling or a hydrodynamic converter. That is, the magnetic field and electric current flow may be selected to generate a Lorentz force which impedes the work fluid circulation, i.e., brakes the work fluid. When a Lorentz force is generated which is directed in the fluid flow direction, the work fluid is accelerated, which produces a stronger fluid-dynamic coupling and therefore an improved torque transmission between two vane wheels. The acceleration of the work fluid for strengthening the fluid-dynamic coupling cannot be achieved with the mechanically displaceable throttle element known from the prior art. Further, the hydrodynamic device according to the present invention may also be used as a drive unit because, for example, the Lorentz force may be generated for setting the work fluid in circulation even when the impeller wheel is stopped so that the turbine wheel is driven in rotation solely by the generation of the Lorentz force.

The direction of the electric current flow in at least one area is not parallel to and is preferably substantially orthogonal to the direction of the magnetic field so that the interaction between the magnetic field and the electric current flow may be utilized with high efficiency in the hydrodynamic device according to the present invention.

The arrangement of the direction of the magnetic field non-parallel to and preferably substantially orthogonal to the work fluid flow direction in the at least one area also facilitates a high efficiency in influencing the flow characteristic of the work fluid. Further, the direction of the electric current flow in the at least one area is not parallel to and is preferably orthogonal to a direction of work fluid flow in the area.

High efficiency in the generation and transmission of torques may also be achieved in that at least one of the vane wheels has a plurality of vanes following one another in the circumferential direction.

Since fluid circulation takes place along an intermediate space between successive vanes in the circumferential direction in an arrangement of plural vanes arranged in succession in the circumferential direction, it is further suggested according to the invention that the magnetic field extends in the area between at least two of the plural vanes of at least one vane wheel.

The intermediate space between two vanes may be utilized in the best possible manner for the above-mentioned generation of Lorentz force for accelerating or retarding the work fluid when the magnetic field extends from one of the at least two vanes to the other of the at least two vanes. For this purpose, means for generating the magnetic field may be provided in at least one of the vane wheels in the area of at least one vane, and are preferably provided in a plurality of vanes or all the vanes of the at least one vane wheel.

A simple arrangement for generating the magnetic field, for example, comprises providing at least one vane that is permanently magnetic. Of course, a plurality of the vanes or all the vanes of a vane wheel may be permanently magnetic. Instead of a permanent magnet, a vane may be arranged for generating a magnetic field by an electric current flow.

Further, it is preferably provided in the hydrodynamic device according to the present invention that at least one of the vane wheels has an outer vane wheel element and an inner vane wheel element. The presence of the inner and outer vane wheel elements is preferably made use of, according to the present invention, so that the electric device for generating an electric current flow through the work fluid is arranged for generating an electrical potential difference between the outer vane wheel element and the inner vane wheel element of the at least one of the vane wheels. Accordingly, existing subassemblies or components in a vane wheel may be used additionally to form the potential difference, thereby obviating the need to add separate structural component parts or subassemblies for affecting the work fluid flow.

To enable the electric current flow through the work fluid, the outer vane wheel element and the inner vane wheel element are in electrically conducting contact with, or can be brought into electrically conducting contact with, the work fluid at least in some areas. In this regard, it is noted that the direction of the electric current flow between the outer vane wheel element and the inner vane wheel element, and therefore the resulting Lorentz force and its direction, may be influenced by suitable selection of the areas of the inner and outer vane wheel elements which are arranged for electrically conducting contact with the work fluid.

It is further suggested that the outer vane wheel element and the inner vane wheel element are connected or can be connected with an electric power supply source by electric line arrangements in the at least one vane wheel.

In an alternative embodiment form of the hydrodynamic device according to the present invention, the magnetic field may extend in the area between the outer vane wheel element and the inner vane wheel element of at least one of the vane wheels. In this embodiment, all of the space available for the movement of the work fluid between the outer vane wheel element and the inner vane wheel element may be utilized for generating the electromagnetic interaction when the magnetic field extends from the outer vane wheel element to the inner vane wheel element, or vice versa.

In this case, an arrangement for generating the magnetic field is preferably provided at the outer vane wheel element and/or the inner vane wheel element, wherein, for example, the outer vane wheel element and/or inner vane wheel element may again be permanently magnetic.

In this embodiment in which the magnetic field extends substantially between the outer vane wheel element and the inner vane wheel element, or vice versa, the device is constructed for generating the electric current flow through the work fluid to generate an electric potential difference between at least two vanes in at least one of the vane wheels for generating a Lorentz force with high efficiency. This arrangement produces an electric current flow direction that runs essentially orthogonal to the magnetic field direction. Further, the resulting Lorentz force is parallel to the movement direction at least in areas of the direction of movement of the circulating work fluid.

In this connection, it is further suggested that the at least two vanes are in electrically conducting contact with, or can be brought into electrically conducting contact with, the work fluid at least in some areas and that the at least two vanes are connected with, or can be connected with, an electric power supply source by electric line arrangements.

To ensure that the current flow occurs between desired areas and that no short circuiting occurs through other components of the hydrodynamic device, at least a portion of the vanes are electrically insulated with respect to the outer vane wheel element and the inner vane wheel element.

As mentioned above, the at least one vane wheel of the hydrodynamic device according to the present invention may comprise at least one impeller wheel and at least one turbine wheel when the hydrodynamic device comprises a torque converter or coupling. If the hydrodynamic device is also to perform the function of efficient torque conversion, it is advantageous when the at least one vane wheel of the hydrodynamic device according to the invention further comprises at least one stator wheel.

When the hydrodynamic device comprises a turbine wheel and an impeller wheel, the magnetic field and the electric current flow through the work fluid are generated in the area of the at least one impeller wheel and/or in the area of the at least one turbine wheel. Since the impeller wheel in such devices generally forms an outer shell, it is advantageous to generate the magnetic field or the current flow in the area of the impeller wheel because it is easier to feed electric lines thereto.

However, it is also possible to generate the magnetic field and the current flow through the work fluid in the area of the at least one stator wheel in a hydrodynamic torque converter.

To minimize electrical losses for efficiently influencing the flow behavior of the work fluid, the work fluid comprises a specific resistance in the range of $10^{-7}$ m to 100 m.

For example, the work fluid may comprise water, preferably the cooling water of a drive unit or a coolant of a drive unit. Alternatively, the work fluid may also comprise an acid, preferably sulfuric acid, or a lye.

As was already mentioned, the hydrodynamic device according to the present invention may be constructed as a hydrodynamic coupling device and preferably comprises a hydrodynamic torque converter or fluid coupling.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
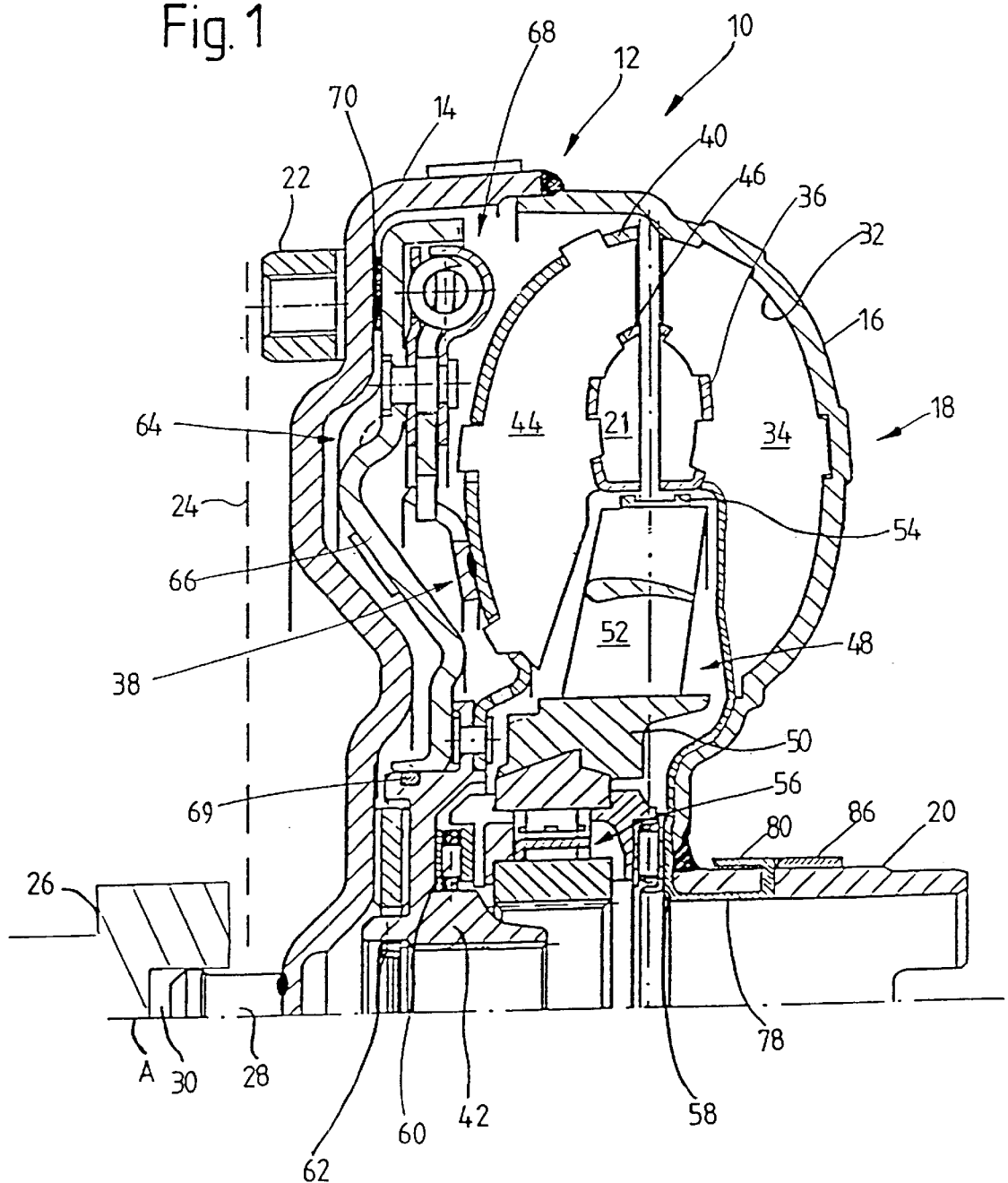
FIG. 1 is a partial longitudinal sectional view through a hydrodynamic device according to an embodiment of the present invention in the form of a torque converter.
Figure 2:
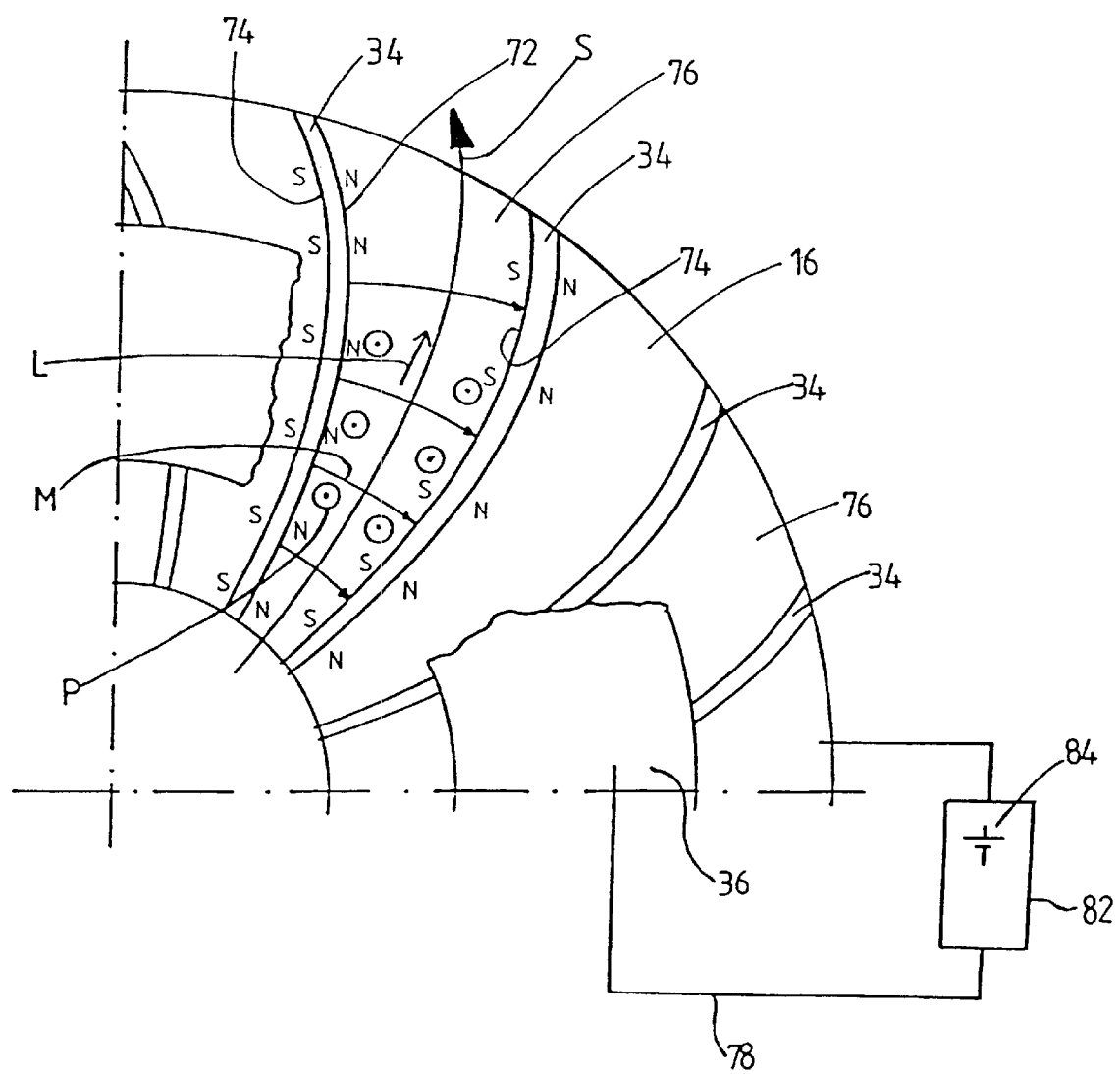
FIG. 2 is a partial axial view of an impeller wheel of the torque converter according to FIG. 1.

FIGS. 1 and 2 show a hydrodynamic device according to an embodiment of the present invention in the form of a hydrodynamic torque converter 10. The hydrodynamic torque converter 10 comprises a housing 12 with a housing cover 14 and an outer impeller wheel shell 16 of an impeller wheel 18. A radial inner side of the outer impeller wheel shell 16 is fixedly connected with an impeller wheel hub 20, for example, by welding. In a manner known per se, the impeller wheel hub 20 is arranged for driving a fluid pump through which fluid is conducted into an interior 21 of the torque converter 10. A radial outer area of the housing cover 14 has a plurality of nut-like coupling elements 22 which are fixedly connected to a drive shaft 26 via a connection arrangement 24. The drive shaft is rotatable about an axis of rotation A and the connection arrangement 24 is fixed with respect to rotation relative to the drive shaft 26. The connection arrangement 24 may be formed, for example, as a radial flexible plate and the drive shaft 26, for example, may comprise a crankshaft of an internal combustion engine. A bearing neck 28 is arranged centrally on the housing cover 14 for engaging in an associated recess 30 of the drive shaft 26 and accordingly centers the torque converter 10 with respect to the drive shaft 26.

An inner surface 32 of the outer impeller wheel shell 16 has a plurality of impeller wheel vanes 34 which are arranged successively in the circumferential direction and connected with one another by a inner impeller wheel shell 36 at an area of the impeller wheel vanes 34 located at a distance from the outer impeller wheel shell 16.

Further, a turbine wheel 38 is arranged in the interior 21 of the torque converter 10 and has an outer turbine wheel shell 40 and a turbine wheel hub 42 connected with the outer turbine wheel shell 40 by riveting or other mechanical connection so that the turbine wheel shell 40 is fixed with respect to rotation relative to the turbine wheel hub 42. The outer turbine wheel shell 40 has a plurality of successive turbine wheel vanes 44 arranged along the circumferential direction. The turbine wheel vanes 44 are connected with one another by an inner turbine wheel shell 46 at an area of the turbine wheel vanes 44 located at a distance from the outer turbine wheel shell 40. The turbine wheel hub 42 may be connected in a manner known per se, such as, for example, by an axial toothing with a transmission input shaft (not shown) so that the turbine wheel hub 42 is fixed with respect to rotation relative to the transmission input shaft for delivering torque.

A stator wheel 48 is arranged axially between the impeller wheel 18 and the turbine wheel 38. Starting from a radially inner side relative to the axis of rotation A, the stator wheel 48 comprises an inner stator wheel ring 50, a plurality of stator wheel vanes 52, and an outer stator wheel ring 54. The inner stator wheel ring 50 forms an outer element relative to the work fluid circulation corresponding to the outer impeller wheel shell 16 and the outer turbine wheel shell. The plurality of stator wheel vanes 52 are arranged successively in the circumferential direction projecting radially outward from the outer element (inner stator wheel ring 50). The stator wheel vanes 52 are again connected with one another by the outer stator wheel ring 54 in their end area at a distance from the axis of rotation A. The outer stator wheel ring 54, with reference to the fluid circulation, forms an inner element corresponding to the inner impeller wheel shell 36 and the inner turbine wheel shell 46. The inner ring 50 of the stator wheel 48 is supported via a freewheel 56 on a supporting element, not shown, which is arranged coaxial to the transmission input shaft, encloses the latter, and is located coaxially inside the impeller wheel hub 20. The freewheel 56 enables a rotation of the stator wheel 48 about the axis of rotation A in one rotational direction, but blocks the rotation of the stator wheel 48 with respect to the opposite direction.

One axial side of the stator wheel 48 is axially supported at the impeller wheel 18 by a bearing 58 and the other axial side of the stator wheel 48 is axially supported at the turbine wheel 38 by a bearing 60. The two bearings 58, 60 may, for example, comprise rolling body bearings or sliding bearings. Further, the turbine wheel 38 is axially supported at the housing cover 14 via another bearing 62 which may comprise, for example, a sliding bearing or rolling body bearing. The torque converter 10 further comprises a lockup clutch 64 with a clutch piston 66. The clutch piston 66 is connected, via a torsional vibration damper 68, with the turbine wheel 38 so that the clutch piston 66 is fixed with respect to rotation relative to the turbine wheel 38. A radial inner area of the piston 66 is received on the turbine wheel hub 42 with the intermediary of a seal element 69 so that the connection therebetween is sealed tight against fluid but is axially displaceable. A radial outer area of the clutch piston 66 may be pressed against the housing cover 14 via a friction lining 70 for producing a lockup state of the torque converter 10. To achieve the lockup state, the fluid pressure in the fluid space between the clutch piston 66 and the outer impeller wheel shell 16 is increased relative to a fluid pressure in a fluid space formed between the piston 66 and the housing cover 14.

The hydrodynamic torque converter according to the present invention comprises an arrangement for influencing the flow behavior of the work fluid circulating between the impeller wheel 18, turbine wheel 38 and stator wheel 48. In the present embodiment, the arrangement for influencing flow behavior comprises impeller wheel vanes 34 constructed as permanent magnets. FIG. 2 shows that side surfaces 72, 74 of the impeller wheel vanes 34 are magnetized so that they have a North pole and South pole, respectively, in the circumferential direction. Work fluid flows in a flow direction S in fluid flow channels 76 formed by adjacent pairs of impeller wheel vanes 34, the outer impeller wheel shell 16 and the inner impeller wheel shell 36. Furthermore, magnetic field lines M extend from the side 72 of an impeller wheel vane 34 formed as North pole to the side 74 of an impeller wheel vane 34 directly following the latter in the circumferential direction which is formed as South pole.

In addition to the generation of the magnetic field, the torque converter according to the invention is arranged so that an electric current flows through the work fluid in this area in which magnetic field lines extend between the impeller wheel vanes 34. As shown in FIG. 1, the inner impeller wheel shell 36 is connected to a control device 82 via an electric line 78 having a first wiper contact 80. The control device 82 may have a power supply source 84 or may cooperate with an external power supply source. The impeller wheel 18, i.e., the impeller wheel hub 20, and therefore also the outer impeller wheel shell 16 which is fixedly connected therewith, is likewise connected with the control device 82 via a second wiper contact 86. Since the outer impeller wheel shell 16 and the inner impeller wheel shell 36 are generally made of metal, for example, deep-drawn sheet metal, the application of a potential difference between the outer impeller wheel shell 16 and the inner impeller wheel shell 36 results in a current flow through the work fluid. Accordingly, the work fluid must be electrically conductive. The work fluid may, for example, comprise water or may also comprise an acid, e.g., sulfuric acid, or a lye. Further, the areas of the outer impeller wheel shell 16, the inner impeller wheel shell 36, and the impeller wheel vanes which contact the work fluid, the electric line 78, or the first and second wiper contacts must be insulated to prevent short-circuiting.

FIG. 2 shows an electric current flow arrow P which runs approximately orthogonal to the magnetic field direction M in large areas of the fluid flow channels 76. The electric current flow P and magnetic field M generate a Lorentz force L directed approximately parallel to the fluid flow direction S. Since the work fluid serves as a current carrier, this Lorentz force acts on the work fluid and the work fluid is accelerated in flow direction S. A reversal of the current flow direction would result in the Lorentz force being directed opposite to the flow direction S and would accordingly lead to a retardation of the fluid flow in direction S.

Accordingly, the strength of the current flowing through the work fluid and the direction of the current flow may be selected to influence the flow characteristics and flow behavior of the fluid circulating in channels 76. A retarded work fluid flow reduces the torque transmission coupling between the impeller wheel 18 and the turbine wheel 38. The reduction of the torque transmission coupling makes the converter "softer" and places the torque converter 10 in a state suitable for starting an internal combustion engine, since no superfluous components of a drivetrain are carried along during rotation of the driveshaft 26. An accelerated work fluid flow produces a "harder" converter characteristic, i.e., a stronger torque transmission coupling between the impeller wheel 18 and turbine wheel 38.

The ability to accelerate the circulation of the work fluid in the torque converter indicates that the electrical energy introduced into the work fluid is converted into kinetic energy and therefore drives the turbine wheel 38 at an increased rotational speed in relation to a state in which the work fluid is not accelerated. Finally, the ability to accelerate the circulation of work fluid may be used to generate a drive torque exclusively by the converter according to the present invention. The drive torque may be generated exclusively by the converter by holding the impeller wheel 18 in the torque converter 10 in a fixed position with respect to rotation relative to it and driving the work fluid in circulation by generating the current flow and a resulting Lorentz force, thereby setting the turbine wheel 38 in rotation.

It is noted that in the converter shown in FIG. 1 various arrangement are possible for influencing the mechanism described above with retardation or acceleration of the work fluid. For example, insulating coatings may be applied to the outer impeller wheel shell 16 and inner impeller wheel shell 36 so that current flow occurs only between determined areas of these components, which can ultimately influence the current flow direction and consequently also the direction of the Lorentz force. Accordingly, it is possible to accelerate the work fluid not only in the flow direction S, but also, for example, toward or away from the outer impeller wheel shell 16 for deliberately preventing the occurrence of cavitation effects in different areas of the fluid flow channels 76.

Alternatively or in addition to the construction of the impeller wheel 18, the turbine wheel 38 and/or stator wheel 48 may also be arranged for generating such effects. The impeller wheel 18 is suitable for this purpose because it forms the outer termination of the converter 10 and thereby allows a simple connection to electric feed lines. Further, the principle of the present invention can, of course, be applied not only in a torque converter, but also in a hydrocoupling, that is, in a corresponding device without a stator wheel, in any type of turbine with through-flow, or even in a pump with only one vane wheel. Moreover, the construction of the torque converter according to the invention can also be modified in that not all of the vanes arranged successively in the circumferential direction need be constructed as permanent magnets or with magnetic fields. Constructing isolated vanes with magnetic fields also leads to the effect described above, although with reduced efficiency since, in this event, the magnetic field lines occur at the North pole of these vanes, extend into the fluid flow channels and reenter at the South pole of the same vane. Accordingly, it cannot be ensured that a magnetic field will flow through the fluid flow channels 76 as uniformly as in the illustrated embodiment form.

Figure 3:
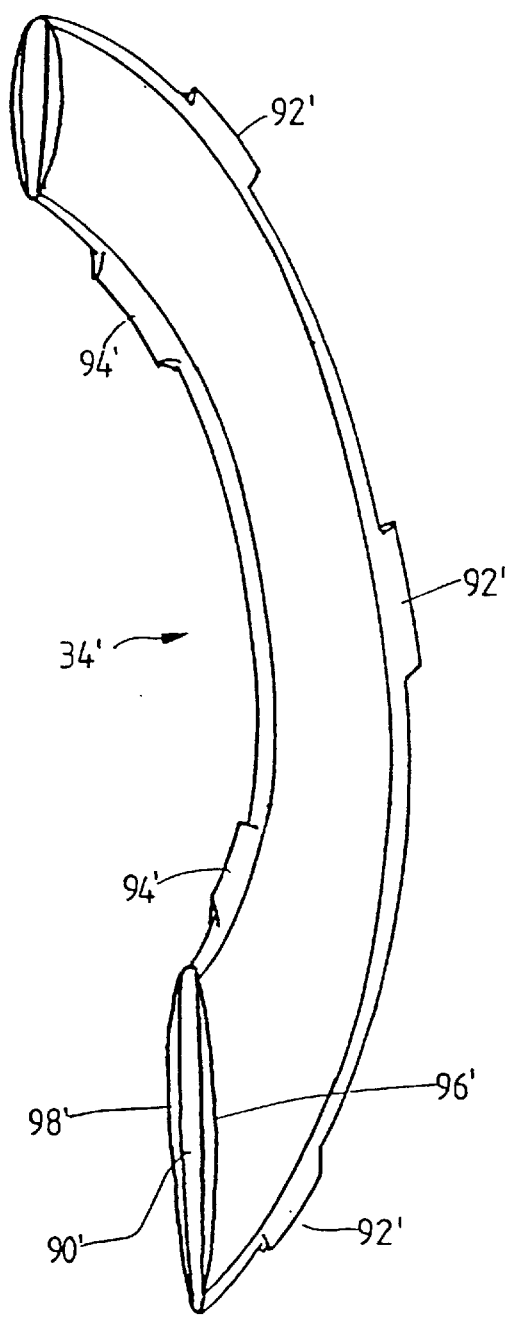
FIG. 3 is a perspective view of a vane from an alternative embodiment of a vane wheel according to the present invention.
Figure 4:
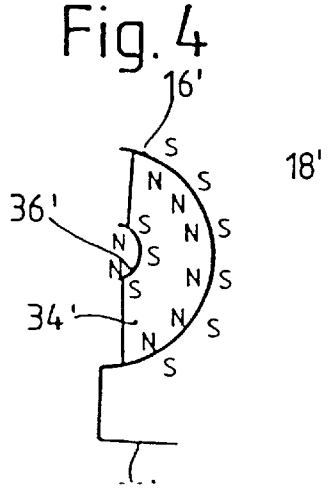
FIG. 4 is a schematic view of another alternative embodiment of a vane wheel according to the present invention.

In a further embodiment, the magnetic field direction and the electric current flow directions may be reversed. FIG. 4, for example, illustrates an outer impeller wheel shell 16' and an inner impeller wheel shell 36' constructed as permanent magnets so that the magnetic field lines extend from one shell to the other. In this case, it must be ensured that the electric current flow takes place between individual impeller wheel vanes 34'. For this purpose, as is shown in FIG. 3, the impeller wheel vanes 34' may comprise a central carrier element 90' arranged with connection projections 92', 94' at the outer impeller wheel shell 16' and inner impeller wheel shell 36'. First and second electrically conducting elements 96', 98' are arranged on opposing circumferential sides of the carrier 90' so that they are isolated from one another by the carrier 90'. This arrangement may be effected, for example, by gluing metal components or by coating the carrier 90', for example, by vacuum deposition. To generate a current flow between two successive vanes 34' in the circumferential direction, all first electrically conducting elements 96' located at a circumferential side of the vanes 34' are brought to the same electric potential and all second conducting elements 98' on the opposing circumferential sides of the vanes 34' are brought to a different common electric potential. Accordingly, an electric current flow occurs in the same circumferential direction between all vanes 34'. Since, the carrier 90' in this embodiment form must either be formed of insulating material or must be insulated at its outer surface to prevent a short circuit between the first and second electrical conducting elements 96', 98', it is ensured at the same time that the first and second electrical conducting elements 96', 98' are insulated with respect to the outer and inner impeller wheel shells 16', 36'. Of course, this principle of generating a Lorentz force can also be used in a turbine wheel or a stator wheel. The individual first and second electrically conducting elements 96', 98' may be connected with the power supply source or the control device by corresponding electric lines which are formed, for example, by vacuum deposition of corresponding conductor portions which are insulated with respect to the outer and inner impeller wheel shells 16', 36'.

According to the present invention, the operating behavior of a hydrodynamic device in the form of a torque converter may be influenced by influencing the flow behavior of a work fluid. In this way, it is possible to adapt to different operating states of a total system containing a device of this kind. For example, the device may be incorporated in a drivetrain of a motor vehicle and the operating behavior may be influenced so that an internal combustion engine of the drive train may be started essentially without a torque transmission coupling between the impeller wheel and turbine wheel. Furthermore, the device may generate a self-supporting drive torque in the area of the torque converter.

The invention is not limited by the embodiments described above which are presented as examples only but can be modified in various ways within the scope of protection defined by the appended patent claims.

I claim:

1. A hydrodynamic device, comprising:
   at least one vane wheel arranged in a housing cover and rotatable about an axis of rotation;
   a work fluid in said housing cover drivable via said at least one vane wheel for circulating in a work fluid circulation, wherein said work fluid is electrically conductive;
   a magnetic device for generating a magnetic field in an area of said work fluid circulation; and
   an electric device for generating an electric current flow through said work fluid.

2. The hydrodynamic device of claim 1, wherein a direction of said electric current flow is not parallel to a direction of said magnetic field in said area of said work fluid circulation.

3. The hydrodynamic device of claim 2, wherein a direction of said magnetic field is not parallel to a direction of said work fluid flow in said area of said work fluid circulation.

4. The hydrodynamic device of claim 2, wherein a direction of said electric current flow is not parallel to a direction of said work fluid flow in said area of said work fluid circulation.

5. The hydrodynamic device of claim 1, wherein said at least one of said vane wheels comprises a plurality of vanes arranged successively along a circumferential direction.

6. The hydrodynamic device of claim 5, wherein said magnetic field extends in an area between two adjacent vanes of said plural vanes of said at least one vane wheel.

7. The hydrodynamic device of claim 6, wherein said magnetic field extends from one of said two adjacent vanes to the other of said two adjacent vanes.

8. The hydrodynamic device of claim 5, wherein said magnetic device is arranged in an area of at least one vane of said plural vanes.

9. The Hydrodynamic device of claim 8, wherein said at least one vane is permanently magnetic.

10. The hydrodynamic device of claim 1, wherein said at least one vane wheel comprises an outer vane wheel element and an inner vane wheel element.

11. The hydrodynamic device of claim 10, wherein said electric device is operatively arranged for generating an electric potential difference between said outer vane wheel element and said inner vane wheel element of said at least one vane wheel.

12. The hydrodynamic device of claim 11, wherein at least a portion of each of said outer vane wheel element and said inner vane wheel element are arranged for making an electrically conducting contact with said work fluid.

13. The hydrodynamic device of claim 11, wherein said electric device comprises an electric power source connected via an electric line arrangement to said outer vane wheel element and said inner vane wheel element of said at least one vane wheel.

14. The hydrodynamic device of claim 10, wherein said magnetic field extends in an area between said outer vane wheel element and said inner vane wheel element of said at least one vane wheel.

15. The hydrodynamic device of claim 14, wherein said magnetic field extends from said outer vane wheel element to said inner vane wheel element.

16. The hydrodynamic device of claim 14, wherein said magnetic device for generating said magnetic field is arranged on at least one of said outer vane wheel element and said inner vane wheel element.

17. The hydrodynamic device of claim 16, wherein said at least one of said outer vane wheel element and said inner vane wheel element is permanently magnetic.

18. The hydrodynamic device of claim 14, wherein said at least one of said vane wheels comprises a plurality of vanes arranged successively along a circumferential direction and said electrical device is operatively arranged for generating an electric potential difference between at least two vanes of said plural vanes of said at least one vane wheel.

19. The hydrodynamic device of claim 18, wherein areas of each of said at least two vanes are arranged for electrically conducting contact with said work fluid.

20. The hydrodynamic device of claim 18, wherein said electric device comprises an electric power supply source characterized in that the at least two vanes are connected with said electric power supply source via electric line arrangements.

21. The hydrodynamic device of claim 10, wherein said at least one of said vane wheels comprises a plurality of vanes arranged successively along a circumferential direction and wherein at least one of said plural vanes is electrically insulated with respect to said outer vane wheel element and said inner vane wheel element.

22. The hydrodynamic device of claim 1, wherein said at least one vane wheel comprises an impeller wheel and a turbine wheel.

23. The hydrodynamic device of claim 22, wherein said at least one vane wheel further comprises a stator wheel arranged between said impeller wheel and said turbine wheel.

24. The hydrodynamic device of claim 22, wherein said magnetic field and said electric current flow through said work fluid are generated in an area of one of said impeller wheel and said turbine wheel.

25. The hydrodynamic device of claim 23, wherein said magnetic field and said electric current flow through work fluid are generated in the area of said stator wheel.

26. The hydrodynamic device of claim 1, wherein said work fluid comprises a specific resistance in the range including $10^{-7}$ m to 100 m.

27. The hydrodynamic device of claim 1, wherein said work fluid comprises one of cooling water of a drive unit, coolant of a drive unit, an acid, sulfuric acid, and a lye.

28. The hydrodynamic device of claim 1, wherein said hydrodynamic device is a hydrodynamic coupling device comprising one of a hydrodynamic torque converter and a fluid coupling.

* * * * *